US Patent Number: 4,695,621
Date of Patent: Sep. 22, 1987

Allada

[54] METHOD FOR REDUCING RESIDUAL MONOMERS FROM OVERSIZED FAT IMBIBING COPOLYMER BEADS

[75] Inventor: Sambasiva R. Allada, Midland, Mich.

[73] Assignee: The Dow Chemical Company, Midland, Mich.

[21] Appl. No.: 812,486

[22] Filed: Dec. 23, 1985

[51] Int. Cl.$^4$ .............................................. C08F 6/00
[52] U.S. Cl. ................................... 528/483; 528/498; 528/503; 525/242; 525/330.3; 525/333.3
[58] Field of Search ....................... 528/483, 498, 503; 210/690; 585/832, 867, 868; 525/330.3, 333.3, 242

[56] References Cited

U.S. PATENT DOCUMENTS 4,061,566  12/1977  Moddell ................................ 210/32

FOREIGN PATENT DOCUMENTS 0183314  6/1986  European Pat. Off. ............ 528/483
3323940  1/1985  Fed. Rep. of Germany ...... 528/498

Primary Examiner—Joseph L. Schofer
Assistant Examiner—F. M. Teskin
Attorney, Agent, or Firm—Veo Peoples, Jr.

[57] ABSTRACT

The residual monomers, solvents and other impurities particularly in coarse or oversized fat imbibing, fat retaining copolymer beads can be substantially reduced by bringing the copolymer beads into contact with a gas in the supercritical state.

6 Claims, 1 Drawing Figure

METHOD FOR REDUCING RESIDUAL MONOMERS FROM OVERSIZED FAT IMBIBING COPOLYMER BEADS

BACKGROUND OF THE INVENTION

This invention relates to a method of reducing residual monomers, polymerization solvents and other impurities particularly from certain coarse or oversized fat imbibing, fat retaining polymer beads. It is more particularly directed to a method whereby these impurities can be reduced by bringing the polymer beads into contact with a gas in the supercritical state.

Certain fat imbibing, fat retaining polymers are known from U.S. Pat. No. 4,432,968 to have especially desirable utility in controlling the body weight of animals, including mammals such as human beings. These polymers are described as pharmacologically-acceptable, solid, particulate, crosslinked, indigestible, fat imbibing, fat retaining, polymers characterized in that they swell in liquid lard, contain less than 100 ppm of residual monomers for small and intermediate size particles but less than 500 ppm for oversized particles and have a volume average particle diameter of from about 0.05 to about 2000 microns.

The polymers are required to be essentially chemically inert in the gastrointestinal tract for pharmacological acceptability and, therefore, should be essentially free of not only unreacted monomers, but also of unreacted initiators, inhibitors, crosslinking agents or the like which are either biologically active or toxic, or chemically reactive with the ingesta. They must be void of any amount of residual solvent, catalysts, etc., that could cause detrimental side effects or vitiate the fat imbibition and weight control.

Previously, the polymers, whether prepared by emulsion or suspension polymerization, were recovered and worked up by conventional techniques such as filtration or screening to remove any coagulum or large-particle waste, dialysis, lyophilization, or particularly, with particle sizes on the order of 0.15 microns and larger, by filtration to separate the reaction medium, alcohol precipitation, washing with lower alkanols, steam distillation or other known techniques.

The preferred technique for making larger particles, e.g. from about 0.3 to 0.5 microns and larger consisted of suspension polymerization and the previous known purification technique for such particles called for passing the suspension through a screen to remove any large coagulum waste, then mixing with 10 parts by volume isopropanol. The particles were allowed to settle, and supernatant liquid removed by decantation. Washing with isopropanol was repeated, if desired. The washed polymer particles were separated by decantation, centrifugation, evaporation, or filtration and used directly or suspended in an aqueous carrier.

In all instances, preferably, purification was achieved by isolating the material as a filter cake and then sequentially washing the intact filter cake with deionized water and then an alcohol such as, for example, 190 proof ethanol or isopropanol, under pressure.

In the past, the size of the polymer bead was inversely related to their effectiveness in absorbing dietary fat. For a given amount of polymer administered, the contact with dietary fat and rate of fat absorption is enhanced as the ratio of surface area to weight of the polymer increases. Thus, smaller particles or so-called fine beads, such as from 100–500 Angstrom units to 5 microns, generally imbibes fat more rapidly and were generally believed more effective on a weight basis than intermediate size beads from 5 to about 80 microns in diameter, which were, in turn, believed more effective than particles in about the 80 to 380 micron range.

However, more recent studies indicate that the acidic gastric juices and more particularly the aqueous surfactant environment of the intestinal lumen substantially reduces the effectiveness of fine and intermediate size polymer beads by hydolytically attacking the imbibed triglycerides or fat. Although a number of means for reinforcing the surface resistance of the small and intermediate size beads have been employed, the most effective insurance against hydrolytic attack has proven to be increasing the diameter of the beads. Accordingly, coarse or oversize beads of about 80 to about 2000 microns have become more important and effective in weight control administration.

Unfortunately, alcohol extraction of coarse or oversize beads has proven to be ineffective. The removal of residual monomers and solvents occurs at a very slow rate of diffusion and the amount of extraction is much lower than that of the fine or intermediate size beads.

The need, therefore, exists for a simple inexpensive method for reducing the esidual monomers, solvents and other impurities from oversize or coarse antiobesity (fat imbibing and fat retaining) polymer beads.

SUMMARY OF THE INVENTION

This need is fulfilled by the process of the invention, whereby antiobesity polymer beads are purified, i.e., residual monomers, solvent, etc., are removed therefrom by contacting with a gas which is under supercritical conditions of temperature and pressure.

It is noteworthy in the discovery of this invention, that normally as the bead size gets smaller, the extraction rates improved substantially because extraction is based upon diffusion which generally occurs much more rapidly through smaller sized particles. However, in the case of fine beads of diameter size 5 microns, supercritical solvent extraction was far less effective than expected, and inefficient.

Likewise, in the case of intermediate size beads of 83–100 microns and supercritical solvent extraction was consistently inferior to the coarse size beads of 100–2000 micron range.

It is an object of the present invention to produce a more effective antiobesity polymer bead capable of improved resistance to hydrolytic attack of gastric juices and intestinal lumen but with substantially reduced residual monomers, solvents, unreacted crosslinking agents, initiators, inhibitors, catalysts, etc.

DETAILED DESCRIPTION AND PREFERRED EMBODIMENTS

Figure 1:
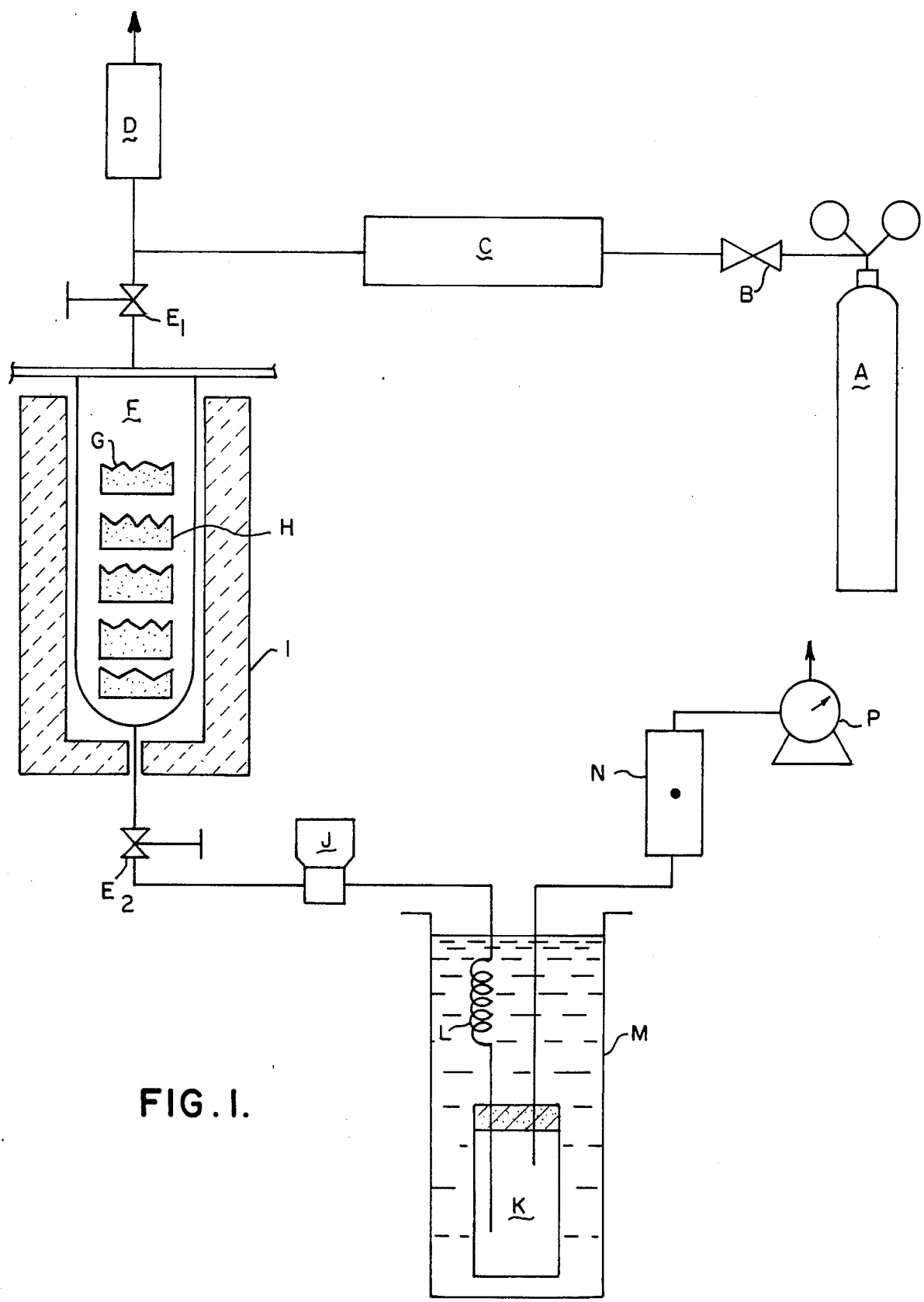

The antiobesity polymer beads of the present invention are pharmacologically-acceptable, solid, particulate, crosslinked, indigestible, fat imbibing, fat retaining, polymers characterized in that they swell in liquid lard, contain less than 500 ppm of residual monomers, preferably less than 100 ppm depending upon the initial impurities, solvent, and/or other impurities and has a volume average particle diameter of from about 80–2000 microns, preferably about 100 to about 2000 microns, and most preferably about 380 to about 2000 microns. The polymers are aptly described in U.S. Pat. No. 4,432,968 which is to the extent consistent herewith, incorporated by reference into this application.

These may be lightly crosslinked copolymers of, for example, isobornyl acrylate, isobornyl methacrylate, styrene or alkylstyrenes (preferably tertiary-alkylstyrenes wherein the alkyl groups contain from 4 to 12 carbon atoms) and one or more alkyl esters of a $C_1$ to $C_{20}$ alcohol and acrylic or methacrylic acid. The alkylstyrene can be, for example, 4-tert-butylstyrene, 4-tert-amylstyrene, 3,5-ditertbutylstyrene, 4-tert-hexylstyrene, 4-tert-octylstyrene or 4-tert-dodecylstyrene. Tertiary-butylstyrene (4-tert-butylstyrene "TBS") is the preferred alkylstyrene. The alkyl ester monomers can include, for example, butyl methacrylate, butyl acrylate, hexyl acrylate, 2-ethylhexyl acrylate, cetyl methacrylate, eicosyl acrylate, the mixed ester cetyl-eicosyl methacrylates, lauryl methacrylate, stearyl methacrylate or lauryl acrylate. The alcohol moiety of the ester is preferably 8 to 20 carbon atoms, and is preferably a linear fatty alcohol residue, such as cetyl, lauryl, stearyl or eicosyl, or a secondary alcohol residue.

The alkylstyrene should be the predominant monomer, the copolymer containing at least 50 percent by weight, and preferably from about 60 to about 85 to 90 percent by weight of the alkylstyrene. The alkyl ester monomer preferably includes both a methacrylate ester and an acrylate ester of one or more $C_8$ to $C_{20}$ fatty alcohols or a $C_8$ to $C_{20}$ fatty alcohol methacrylate or acrylate as essentially the sole comonomer.

The copolymer is preferably lightly crosslinked to insure that the polymer will not be soluble in or miscible with dietary fats and oils. Too much crosslinking, i.e. 0.5 percent by weight or more, will hinder or prevent the polymer particles from imbibing fats. In general, the preferred polymers can contain from about 0.001 to about 0.1 percent by weight of a crosslinking agent (based on the total weight of the alkylstyrene and alkyl ester monomers). Preferably, about 0.01 to about 0.075 percent of crosslinking agent is employed. The crosslinking agent can be any di- or polyfunctional compound known to be useful as a crosslinking agent in polymeric vinyl addition compositions, such as divinylbenzene, vinylisopropenylbenzene, butadiene, or other polyethylenically unsaturated crosslinking agents described, for example, in U.S. Pat. No. 3,520,806. Divinylbenzene is preferred as a crosslinking agent, in amounts from about 0.025 to about 0.05 to about 0.075 to about 0.1 weight percent.

Suspension polymerization is a well-known process for forming polymer particles with spherical or beadlike configuration and relatively uniform particle size, and this technique can be conveniently employed to make the polymers.

The polymers are preferably, but not necessarily, prepared by emulsion or suspension polymerization of the monomers (and crosslinking agent) in an aqueous emulsion or aqueous suspension. In emulsion polymerization, the polymerization occurs in micelles formed by the monomer mixture and the emulsifier. In the suspension technique, polymerization occurs in monomer droplets suspended in the aqueous phase. Suspension polymerization is preferred for making larger particles, e.g. from about 0.3 to 0.5 micron and larger.

The polymerization reaction proceeds at temperatures from about 50° to 120° C., conveniently from 70° to 90° C., and in the presence of a minor amount (typically from about 0.5 to 10 times the amount of the crosslinking agent) of a polymerization initiator such as potassium persulfate or tertiary-butyl peroctoate. In preparing the copolymers, the monomers and crosslinking agent are mixed together, in the proportions corresponding to those desired for the product, then dispersed in water containing either an emulsifying agent or a suspending agent. The proportions are preferably selected so the monomer plus crosslinking agent comprises about 20 to about 60 percent by weight of the aqueous mixture. The polymerization initiator is mixed with either the monomer mixture or the aqueous phase depending on the polymerization method, the initiator used and its relative solubility in the two phases. The mixture is then mixed, e.g., with a high-shear mixer or a homogenizer, to disperse the monomer phase in the aqueous phase, and to reduce the particle size of the mixture of monomer and crosslinking agent to the size desired for suspension polymerization; or to form micelles of the desired size for emulsion polymerization. The resulting mixture is heated with stirring at a temperature in the polymerization temperature range until the reaction is substantially complete (generally 4 to 24 hours).

The copolymer product can then be recovered and worked by filtration or screening to remove any coagulum or large-particle waste.

Supercritical solvent extraction is then employed to reduce residual monomers, solvent catalyst unreacted initiators, inhibitors, etc.

The gas used in the process of the invention can be any relatively inert to the copolymer and having a critical temperature below the glass-transition temperature of the polymer, preferably below about 50° C. The supercritical extraction temperature should be low enough to avoid undue softening of the polymer but close enough to the critical temperature to maximize the efficiency of mass transfer or extraction. The gas can be, for example, a saturated or unsaturated monoethylenically unsaturated hydrocarbon, a halogenated hydrocarbon, carbon dioxide, dimethylether or diethylether. Ethylene and carbon dioxide are preferred. Ethylene performs better at shorter extraction time (e.g. 60 minutes) but it lost its advantage to $CO_2$ at longer time (e.g. 90 minutes).

The process of this invention is conducted by bringing the gas, in the supercritical state, into intimate contact with the antiobesity polymer beads, as by bubbling or sparging the gas through the beads contained in a pressure vessel or as in a fluidized bed. Residual monomers, solvents, etc. are extracted at a level of over 90% of the original amount at moderate temperatures below the glass transition temperatures of the polymers and maximum pressures needed were on the order of about 3000 to 4000 psi, although preferably 1200-3000 psi. It is especially preferred to use 1800-3000 psi. The time will depend upon the particle size, amount of residual monomer, pressure and temperature.

FIG. 1 is exemplary of apparatus which may be used in accordance with the invention. It consists of a solvent source (A), a compressor (C) to pressurize the solvent, and a high pressure autoclave (F) equipped with a safety relief valve (D) and control valves $E_1$ and $E_2$. An electric furnace (I) may be controlled to maintain the temperature of the autoclave, in which the polymer beads to be extracted may be placed in metal cups (G) stacked on top of one another. Fat imbibing beads prepared in accordance with this invention prior to their extraction and designated by the letter (H) are inserted into the cups (G). A serrated top on each cup permits freeflow of the solvent to and from the beads. A back pressure regulator (J) maintains the pressure inside the autoclave approximately constant (±50 psi). A cold bath (M) cools the depressurized fluids from J and collects any condensate in a receptacle (K) via a cooling coil (L). A rotameter (N) indicates the gas flow rate at any given instant to facilitate flow regulation, while a wet test meter (P) shows the cumulative flow volume of the uncondensable gas.

Also, the process can be conducted in a continuous mode, where gas in the supercritical state is continuously bubbled or sparged through the polymer beads which can be fed continuously into the pressure vessel.

After removing the condensable monomers and solvents, the noncondensable gas may be recompressed and recyled. Entrainers may be used to increase the solubility of some residual monomers and/or impurities in the solvent gas, or to decrease their solubility in the copolymer beads. Entrainers can be any organic solvent where the residuals or impurities are soluble. Entrainers are preferably more volatile and insoluble in the copolymer beads. Illustrative of liquids which can be used are aromatic hydrocarbons, ethyl alcohol, diethyl ether, dioxane, diethylene glycol dimethyl ether, but particularly preferred is ethyl alcohol. Ethanol entrainer in carbon dioxide gas extraction solvent was demonstrated to increase the extraction rate of certain residual monomers such as tertiary-butylstyrene (tBS) monomer and tertiary-butylethylbenzene (tBEB). Propane entrainer on the other hand had a negative effect in that application. Accordingly, entrainer selection must be coordinated from well-known parameters such as critical point and miscibilities.

The entrainer is employed at a concentration of about 2 to 15% by volume of the solvent. It can be introduced directly onto the polymer beads prior to purification or it can be introduced into the pressure vessel with the extraction solvent gas stream.

Inevitably, the entrainer at least partly condenses when the gas is released from supercritical state. The amount can be minimized by keeping the gas pressure as high as possible during this stage of the process, if desired. It can be retained in the gas and, of course, recycled if desired.

Other objectives and embodiments of the invention will be apparent from the following examples which are illustrative of and not limitations on the present invention.

EXAMPLE 1

A number of 3 g samples of spherical antiobesity copolymer beads were prepared. The beads in each sample consisted of about 70% by weight tertiary-butylstyrene (tBS), and about 30% by weight lauryl methacrylate (LMA), lightly crosslinked with about 0.05% by weight divinylbenzene (DVB). Each sample comprised beads having one of four different average diameters. Some were about 381 microns. Others comprised an average diameter of about 100 microns, while still others have sized of 83 microns, and some had sizes of 5 microns.

The samples were placed in separate metal cups. The cups were stacked in the autoclave, then air flushed out with $CO_2$, and the temperature was raised to one of several different supercritical temperatures that appear in the tables found below. The autoclave was pressurized with one of the several supercritical solvent gasses described below while still maintaining the supercritical temperature. The compressor and the backpressure regulator (BPR) were adjusted to maintain the autoclave pressure within ±50 psi. The depressurized gas discharged from the BPR was measured by the wet test meter and discharged in the hood. After the desired duration of extraction, the solvent feed was stopped and the top control valve ($E_1$ in the drawing) closed. The autoclave was allowed to cool and depressurize slowly to atmosperic pressure by slowly opening the BPR. The initial and final readings of the wet test meter were noted. The samples were removed from the autoclave and analyzed, along with the untreated samples, for tertiary-butylstyrene (tBS) monomer and tertiarybutylethylbenzene (tBEB) monomer by liquid chromatography.

The following gasses having critical temperatures (Tc) close to ambient were employed: $C_2H_4(T_C=9°$ C.), $C_2H_6(Tc=32.3°$ C.) and $CO_2$ (Tc=31° C.) were selected so that they were slightly supercritical at temperatures below the glass transition temperature (Tg) of the copolymer beads (50° C.). Operating pressures ranged from 1.7 to 3 times the critical pressure of the solvent gas.

The results are set forth in the following tables.

TABLE I

| | | | | | | tBS | | tBEB | | |
|---|---|---|---|---|---|---|---|---|---|---|
| Sample # | Bead Size, μ | Entrainer | P psi | T °C. | t min | Initial ppm | % Extracted | Initial ppm | % Extracted | Comments On Sample |
| 1 | 381 | — | 2300 | 41 | 60 | 1436 | 78.9 | 1363 | 80.6 | Sintered |
| 2 | 381 | EtOH | 2325 | 42 | 60 | 1436 | 85.1 | 1363 | 85.7 | Sintered |
| 3 | 5 30% | — | 2300 | 42 | 60 | 300 | 64.7 | 1396 | 65.5 | Sintered |
| 4 | 5 H$_2$O | EtOH | 2300 | 42 | 60 | 300 | 41.7 | 1396 | 49.3 | Sintered |
| 5 | 381[a] | — | 2350 | 57 | 60 | 1436 | 67.5 | 1363 | 71.2 | Sintered/caked |
| 6 | 381[c] | — | 2350 | 57 | 60 | 1436 | 70.9 | 1363 | 67.0 | Free-flowing |
| 7 | 100[a] | — | 2350 | 57 | 60 | 1515 | 21.8 | 1879 | 41.0 | Sintered |
| 8 | 100[b] | — | 2350 | 57 | 60 | 1515 | 18.5 | 1879 | 36.2 | Slightly sintered |
| 9 | 381 | — | 1900 | 42 | 90 | 1436 | 90.5 | 1363 | 95.5 | Free-flowing |
| 10 | 83 | — | 1900 | 42 | 90 | 1466 | 43.5 | 1872 | 42.0 | Lightly caked |
| 11 | 5 | — | 1900 | 42 | 90 | 300 | 64.7 | 1396 | 87.8 | Caked & shrunk |

[a]Coated with clay (1%).
[b]Coated with clay (5%).
[c]Coated with clay (10%).

TABLE II

EXTRACTION OF RESIDUAL MONOMERS WITH $C_2H_4$

| Sample # | Bead Size μ | P psi | T °C. | t min | tBS Initial ppm | tBS % Extracted | tBEB Initial ppm | tBEB % Extracted | Comments on Sample |
|---|---|---|---|---|---|---|---|---|---|
| 14 | 381[a] | 1610 | 28 | 60 | 1436 | 68.0 | 1363 | 74.0 | Free-flowing |
| 15 | 5 | 1610 | 28 | 60 | 300 | 65.7 | 1396 | 86.0 | Sintered, shrunk |
| 16 | 381 | 2150 | 42 | 60 | 1436 | 84.5 | 1363 | 97.2 | Free-flowing |
| 17 | 83 | 2150 | 42 | 60 | 1466 | 47.5 | 1872 | 13.9 | Lightly caked |
| 18 | 5 | 2150 | 42 | 60 | 300 | 78.7 | 1396 | 84.5 | Caked, shrunk |
| 19 | 381 | 2200 | 42 | 90 | 1436 | 89.8 | 1363 | 95.0 | Free-flowing |
| 20 | 83 | 2200 | 42 | 90 | 1466 | 56.6 | 1872 | 56.4 | Lightly caked |
| 21 | 5 | 2200 | 42 | 90 | 300 | 71.3 | 1396 | 89.5 | Caked & shrunk |

[a]Coated with clay

Level of extraction could be improved or increased to higher levels with higher pressures and longer extraction times as noted in Table IV and Table V respectively.

TABLE III

EXTRACTION OF RESIDUAL MONOMERS FROM AOP BEADS WITH $C_2H_6$

| Sample # | Bead Size μ | P psi | T °C. | t min | tBS Initial ppm | tBS % Extracted | tBEB Initial ppm | tBEB % Extracted | Comments on Sample |
|---|---|---|---|---|---|---|---|---|---|
| 22 | 381[a] | 1350 | 42 | 60 | 1436 | 72.1 | 1363 | 70.0 | Slightly sintered |
| 23 | 381[c] | 1350 | 42 | 60 | 1436 | 74.9 | 1363 | 75.6 | Free-flowing |
| 24 | 100 | 1350 | 42 | 60 | 1515 | 28.8 | 1879 | 35.1 | Slightly caked |
| 25 | 100[b] | 1350 | 42 | 60 | 1515 | 32.7 | 1879 | 36.5 | Free-flowing |
| 26 | 5 | 1350 | 40 | 60 | 300 | 12.3 | 1396 | 62.8 | Caked, shrunk |

[a]Coated with clay (1%)
[b]Coated with clay (5%)
[c]Coated with clay (10%)

TABLE IV

EFFECT OF PRESSURE ON EXTRACTION OF RESIDUAL MONOMERS

| Particle Size: | 83 micrometer |
| Solvent | $CO_2$ |
| Time | 90 Minutes |
| Temperature | 42° C. |

| Pressure Psi | % Extracted tBS | % Extracted tBEB |
|---|---|---|
| 1900 | 43.5 | 42 |
| 2300 | 69.2 | 68 |
| 2500 | 75.0 | 76 |
| 2900 | 87.0 | 87.3 |
| 3200 | 90.5 | 90.7 |

TABLE V

EFFECT OF TIME ON EXTRACTION OF RESIDUAL MONOMERS

| Particle Size: | 381 micrometer |
| Solvent | $CO_2$ |
| Pressure | 2300 psi |
| Temperature | 41° C. |

| Time Minutes | % Extracted tBS | % Extracted tBEB |
|---|---|---|
| 60 | 78.9 | 80.6 |
| 80 | 88.4 | 88.0 |
| 100 | 94.0 | 93.7 |
| 120 | 95.2 | 95.5 |

I claim:

1. In a method for making oversized fat imbibing, fat retaining, copolymer beads from cross linked copolymers of an ethylenically unsaturated monomer selected from the group consisting of isobornyl acrylate, isobornyl methacrylate, styrene or $C_4$-$C_{12}$ alkyl styrene and at least one ester of a $C_8$ to $C_{20}$ fatty alcohol and acrylic or methacrylic acid, the improvement comprising purifying beads prepared from said crosslinked copolymers and having a volume average particle diameter of from about 380 to about 2,000 microns, and a residual monomer content of less than about 500 ppm by extracting at least 70% of the residual monomers with a gas under supercritical conditions of from about 42° C. to 50° C., at pressures of from about 1800 to about 3000 psi for a period of from 1 to about 2 hours;
   whereby the beads exhibit improved resistance to hydrolytic attacks of gastric juices and intestinal lumen and contain substantially reduced amounts of residual monomers, solvents, unreacted cross linking agents, initiators, inhibiters and catalysts.

2. The method of claim 1 wherein the supercritical fluid is carbon dioxide.

3. The method of claim 1 wherein the gas used to extract the polymer beads under supercritical conditions is $C_2H_4$ and the period of extraction is no more than 60 minutes.

4. The method of claim 1 wherein the supercritical fluid is augmented with an entrainer.

5. The method of claim 1 wherein the copolymer comprises tertiary butylstyrene monomer and lauryl methacrylate monomer crosslinked with divinylbenzene.

6. The method of claim 1 wherein the copolymer beads have an average particle size diameter of about 381 microns.

* * * * *